(12) United States Patent
Rhodes

(10) Patent No.: US 6,487,768 B2
(45) Date of Patent: Dec. 3, 2002

(54) HEAT EXCHANGER MANUFACTURING SYSTEM

(75) Inventor: Richard O. Rhodes, San Francisco, CA (US)

(73) Assignee: Fafco Incorporated, Chico, CA (US)

( * ) Notice: Subject to any disclaimer, the term of this patent is extended or adjusted under 35 U.S.C. 154(b) by 0 days.

(21) Appl. No.: 09/836,056

(22) Filed: Apr. 16, 2001

(65) Prior Publication Data

US 2002/0148116 A1 Oct. 17, 2002

(51) Int. Cl.[7] .................................................. B23P 15/26
(52) U.S. Cl. ...................... 29/564.8; 29/33 K; 29/33 G; 29/33 T; 29/890.047; 29/890.045; 29/726; 29/782; 165/162
(58) Field of Search ................................ 29/33 G, 33 T, 29/33 K, 564.8, 564.6, 564.7, 726, 727, 890.047, 890.045, 890.03, 564.1, 564, 782, 787, 33 D, 33 S, 771, 779, 235, 282; 165/162

(56) References Cited

U.S. PATENT DOCUMENTS

| 3,406,838 | A | * | 10/1968 | Davidson ..................... 29/726 |
| 4,087,908 | A | * | 5/1978 | Fusco et al. ................ 29/564.4 |
| 4,148,118 | A | * | 4/1979 | Fleischhacker et al. ..... 29/33 K |
| 4,241,785 | A | * | 12/1980 | O'Connor et al. ..... 29/890.047 |
| 4,382,329 | A | * | 5/1983 | Takaoka et al. ............... 29/726 |
| 4,386,456 | A | * | 6/1983 | Volz ............................ 165/162 |
| 4,700,469 | A | * | 10/1987 | Kroetsch et al. ............... 29/726 |
| 5,407,004 | A | * | 4/1995 | DeRisi et al. .......... 29/890.043 |
| 6,038,768 | A | * | 3/2000 | Rhodes .................. 29/890.043 |
| 2001/0040021 | A1 | * | 11/2001 | Avequin et al. ................ 165/67 |
| 2001/0049870 | A1 | * | 12/2001 | Akutsu et al. .............. 29/33 G |

* cited by examiner

*Primary Examiner*—Andrea Wellington
*Assistant Examiner*—Erica E Cadugan
(74) *Attorney, Agent, or Firm*—Beyer Weaver & Thomas, LLP

(57) ABSTRACT

Improved plastic heat exchanger production systems are described. The production systems are arranged to extrude plastic tubing, cut the tubing into segments of desired length and convey the tubing to a plurality of aligned tube inserters. Clip strips are feed through the tube inserters which sequentially automatically insert tube segments into the clip strips. The clip strips are then cut at desired lengths to provide tubing panels of a desired size or sizes. In a preferred system, header pipes are attached to the respective ends of the cut tubing panels to provide completed heat exchanger panels. When desired, heat exchangers having laterally offset tubes may be created by cutting one or more middle clip strips into spacer segments and rotating the spacer segments to laterally offset at least some of the tubes. In another aspect of the invention, improved tube inserters suitable for inserting plastic tubing into a plastic clip strip are described.

16 Claims, 10 Drawing Sheets

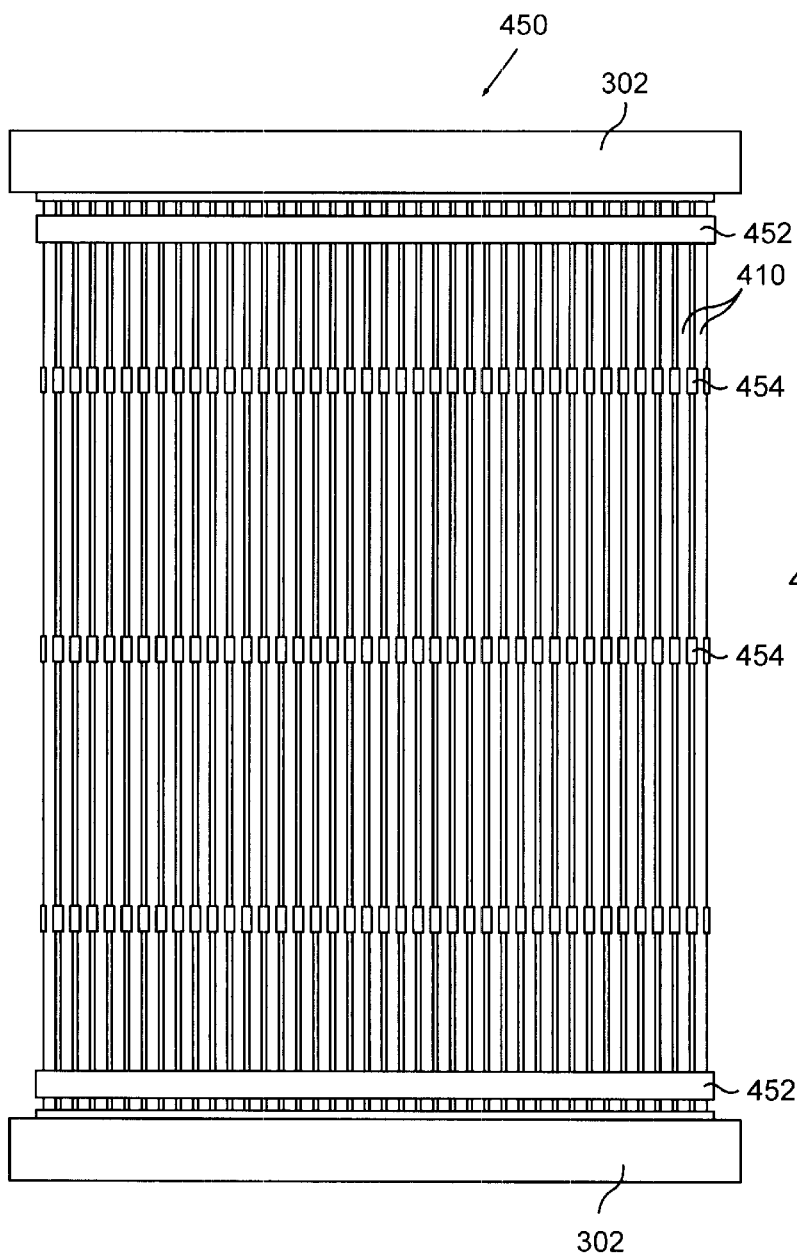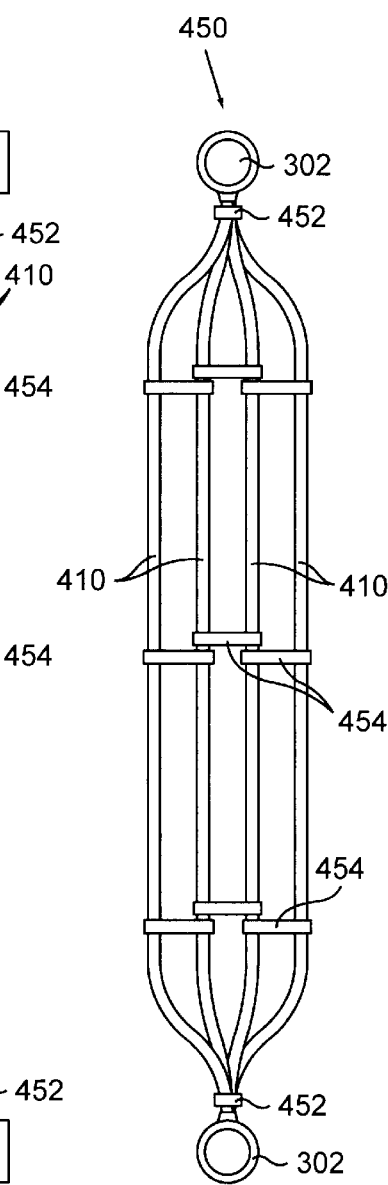
Figure 5(c)
Figure 5(d)

HEAT EXCHANGER MANUFACTURING SYSTEM

BACKGROUND OF THE INVENTION

The present inventions relate generally to the manufacture of heat exchangers formed from plastic tubing. More particularly, heat exchanger fabrication production lines and methods for producing plastic tubing based heat exchangers are described.

Heat exchangers come in a wide variety of configurations and are used in a wide variety of applications. One type of simple heat exchanger contemplate simply running a plurality of riser tubes 21 between a pair of header pipes 23 (often called manifolds) as illustrated in FIG. 1. The header pipes 23 and risers 21 can be formed from a wide variety of materials, but one class of heat exchangers utilizes simple extruded plastic tubing. A variety of plastics may be used to form the panels, although generally a dark, thermoplastic material is used. The illustrated type of heat exchangers have a number of desirable attributes including that they are simple, lightweight, and relatively rugged when exposed to adverse environmental conditions including repeated freezing and thawing, exposure to water and/or corrosive chemicals and prolonged exposure to the sun. They are also relatively simple to produce. Thus, they can be used in a wide variety of systems. By way of example, for a number of years, the assignee of the present application has produced and sold this type of heat exchanger for use in solar heating applications and thermal energy storage systems.

A number of existing patents describe techniques for producing plastic heat exchangers. By way of example, U.S. Pat. Nos. 3,934,323 and 4,243,454 describe suitable techniques. Although the existing production techniques work well, there are continuing efforts to improve the efficiency of the production process.

SUMMARY OF THE INVENTION

To achieve the foregoing and other objects and in accordance with the purpose of the present invention, improved plastic heat exchanger production systems are described. In one method aspect, plastic tubing is extruded, cut to tube segments of desired length and conveyed onto a platform. A plurality of clip strips are fed across the platform and the tube segments are sequentially automatically inserted into the clip strips. The clip strips are then cut at desired lengths to provide heat exchanger tubing panels of a desired size or sizes. In a preferred system, header pipes are then attached to the respective ends of the cut heat exchanger tubing panels.

In some implementations either flat tubing panels or panels having laterally offset tubes may be produced using the same production line. In one embodiment, heat exchanger panels having laterally offset tubes may be created by cutting one or more middle clip strips into spacer segments and rotating the spacer segments to laterally offset at least some of the tubes.

In another aspect of the invention, a heat exchanger production line is described. The production line includes an extruder for extruding plastic tubing and a tubing cutter for cutting extruded plastic tubing into tube segments and a plurality of aligned tube inserters. The tube inserters are each arranged to receive the extruded plastic tubing and an associated clip strip and to automatically inserting the tubing into their associated clip strip. Clip strip cutters are provided for cutting the clip strips at desired locations to provide heat exchanger tubing panels. In a preferred embodiment, a pipe attacher is provided to attach header pipes to the ends of the heat exchanger tubing panels.

In some embodiments a plurality of clip strip feeder reels are provided, with each feeder reel being arranged to feed an associated tube inserter. In various embodiments, a support beam is provided to carry the tube inserters. In this arrangement, the tube inserters may be slidably mounted on the support beam to facilitate adjusting the spacing of the clip strips in the heat exchanger tubing panels. A rotator may also be provided to rotate spacer segments cut from a selected clip strip relative to other (typically end) clip strips to provide lateral spacing for some of the tubes in the heat exchanger tubing panel.

In one preferred arrangement, the extruder, a cooling trough, the tubing cutter and the tube inserters are arranged along one line and the clip strip feed reels, the clip strip cutters and the pipe attacher are aligned along a second line that transversely intersects the first line at the tube inserters.

In another aspect of the invention, improved tube inserters suitable for inserting plastic tubing into a plastic clip strip are described. In one preferred arrangement, the tube inserter includes a clip strip feed channel for receiving a clip strip and a tubing feed channel for receiving tubing. A clip strip advancer, an actuator and a clip strip cutter. The clip strip advancer is arranged to advance the clip strip through the clip strip feed channel. The actuator presses received tubing into the clip strip and the clip strip cutter is arranged to cut the clip strips when desired. In a preferred arrangement, a plurality of these tube inserters are slidably mounted on a support beam to facilitate the production of heat exchanger tubing panels.

BRIEF DESCRIPTION OF THE DRAWINGS

The invention, together with further objects and advantages thereof, may best be understood by reference to the following description taken in conjunction with the accompanying drawings in which:

FIGS. 5(c) & 5(d) are diagrammatic front and side views respectively of a type of heat exchanger panel having laterally spaced heat exchange tubes that may be fabricated using the production line illustrated in FIG. 2.

DETAILED DESCRIPTION OF THE INVENTION

Figure 1:
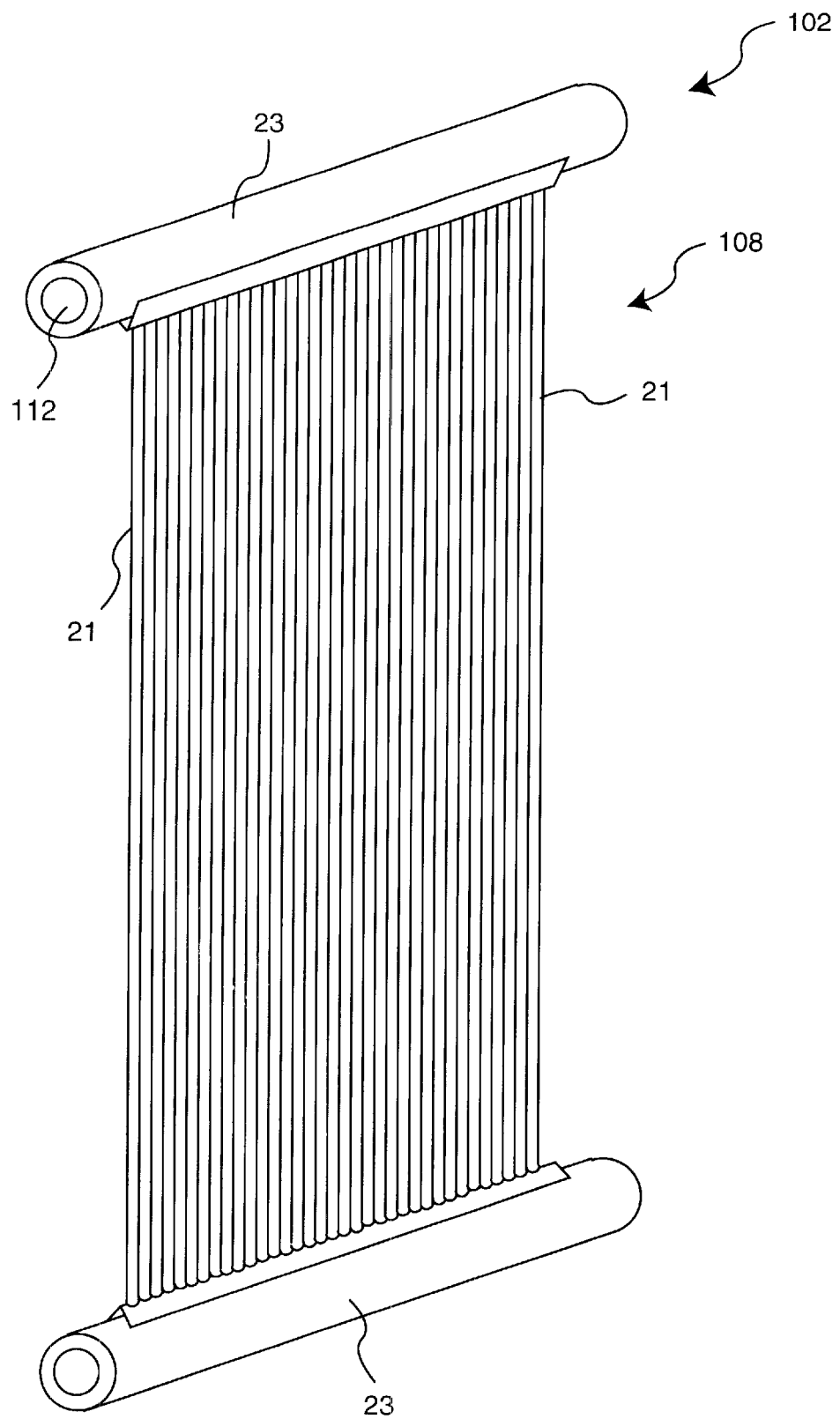
FIG. 1 is a perspective view of a representative plastic tubing heat exchanger.

A heat exchanger production line in accordance with one embodiment of the invention will be initially described with reference to FIG. 2. As seen therein, the illustrated production line includes an extruder 110 that feeds extruded plastic tubing 115 to a tube handling line 120, a tube insertion station 130 that insert tube segments into a plurality of aligned clip strips, and a panel assembly station 150. The extruder 110 may take the form of an ordinary plastic tubing extruder that outputs a continuous stream of extruded plastic tubing. The tubing may be formed from any suitable plastic material such as any of a variety of thermoplastic materials. By way of example black polypropylene has been found to work well. The black coloring is particularly useful in panels that will be used for solar heating applications.

The tube handling line 120 takes the extruded plastic tubing (which is typically relatively hot) and runs it through a cooling trough 122 to harden the tubing. A puller 124 is provided to draw the tubing and a cutter 126 is provided to cut the tubing into tube segments having a length as is required for the particular heat exchangers being produced. Appropriate controllers (which may be computer based or dedicated controllers) are used to control the cutter and puller. If desired, the cutter and puller may be integrally formed, and of course, their relative placement may be widely varied.

In the described embodiment, the tubing is extruded in-line which is typically going to be the most efficient production method. However, it should be appreciated that pre-formed tubing can be supplied in place of the in-line extruder 110. By way of example, reels of tubing can be used to feed the tube handling line. In this embodiment the cooling trough 122 would be unnecessary.

Tube segments outputted by the cutter 126 are fed to the tube insertion station 130 by a conveyor system 132. The conveyor system may take any suitable form. By way of example, a belt conveyor 134 and a roller based tube drive 136 work well. The tube station includes a plurality of aligned tube inserters 140 that each receive a clip strip 200 fed from an associated clip supply reel 142. One suitable embodiment of the tube inserters is described below with reference to FIG. 3. The tube inserters 140 are each arranged to sequentially snap tube segments into their associated clip strip 200. After a tube segment 205 has been inserted, the clip strips are indexed, a new tube segment is brought into position and the insertion process is repeated in a continuous manner. Thus, the output of the tube insertion station 130 is an essentially continuous panel of tubes. The clip strips are then cut at appropriate lengths to form tubing panels. In the described embodiment, the cutting into panels is done using cutters on the tube inserters, although the cutting may be done at any suitable location.

Figure 8:
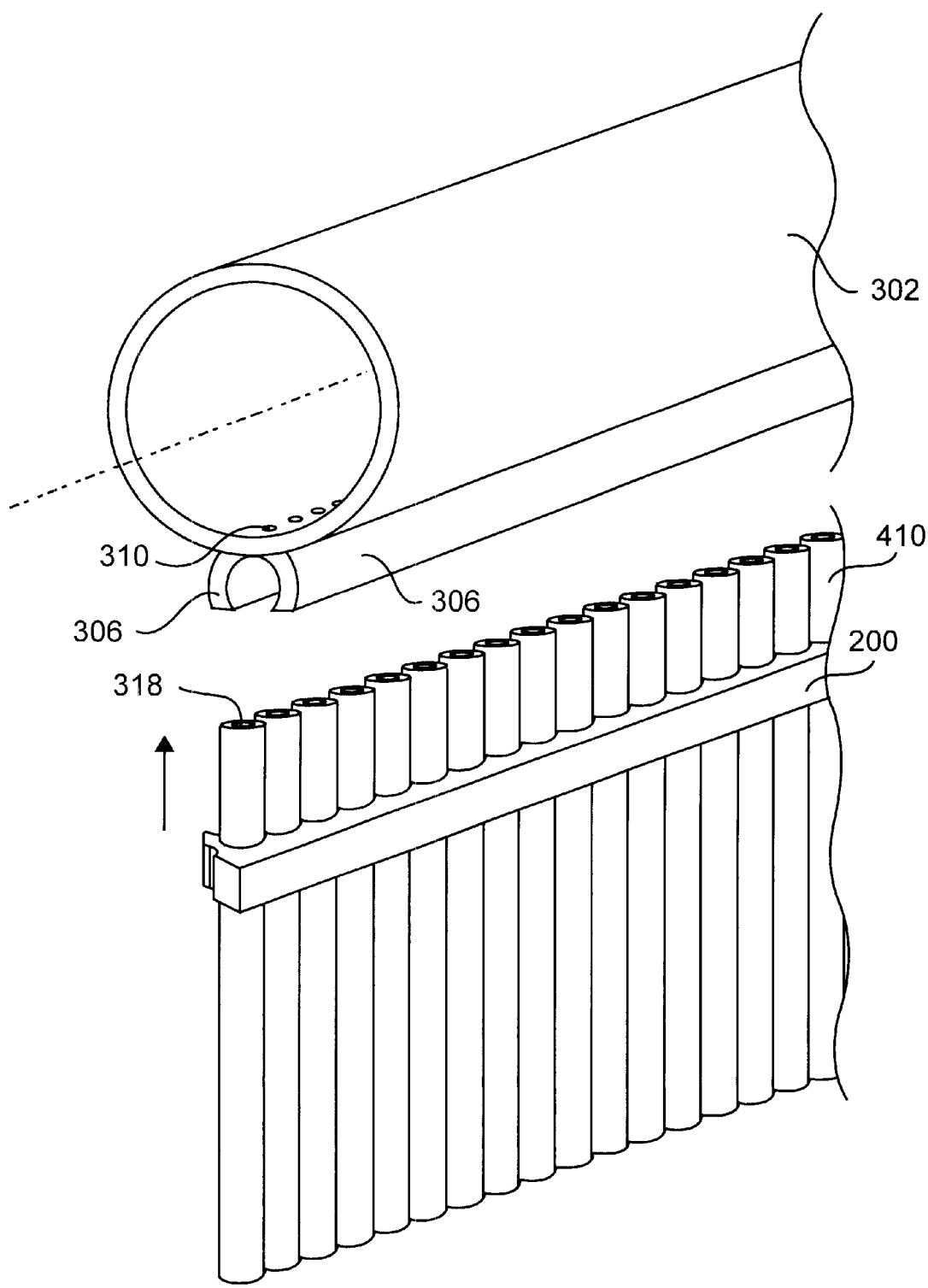
FIG. 8 is a diagrammatic illustration of an embodiment of a header pipe suitable for use by the pipe attacher.

The tubing panels are then conveyed to a panel assembly station 150 that includes a pipe attacher 153 that is arranged to attach header pipes 302 to the respective ends of the tubing panels. The header pipes 302 may be attached to the tubing panels in any suitable manner. In the embodiment shown, the end clip strips 200 serve to hold the ends of the tubes together to facilitate attachment of the header pipes. In a preferred embodiment, the header pipes 302 are attached using the process described in commonly assigned U.S. Pat. No. 6,038,768 issued Mar. 21, 2000, which is incorporated herein by reference in its entirety. In this embodiment, the header pipes 302 (illustrated in FIG. 8) include flanges 306 which are formed on header pipe 302 using an extrusion process. As shown, and described in the referenced patent, flanges 306 may be "curved" sections of polypropylene, or substantially any other suitable thermoplastic material, although it should be appreciated that flanges 306 may take on any suitable configuration. It is noted that in the primary process illustrated in the '768 patent, the tubes in the tubing panels are tacked together. In the embodiment described herein, this tacking of the tubes together is not required since the clip strips 200 perform a similar function of holding the tubes together. Although the end clips are used to hold the tube ends together in the described embodiment, it should be appreciated that they are not required and indeed, in certain applications it may be preferable to not hold the tube ends closely together using an end clip.

After attachment of the header pipes, the basic construction of the heat exchanger panels is complete. Of course, when desired, additional production steps (such as installing additional plumbing in, on or with the panel) may be added as desired or required for particular applications.

Figure 3:
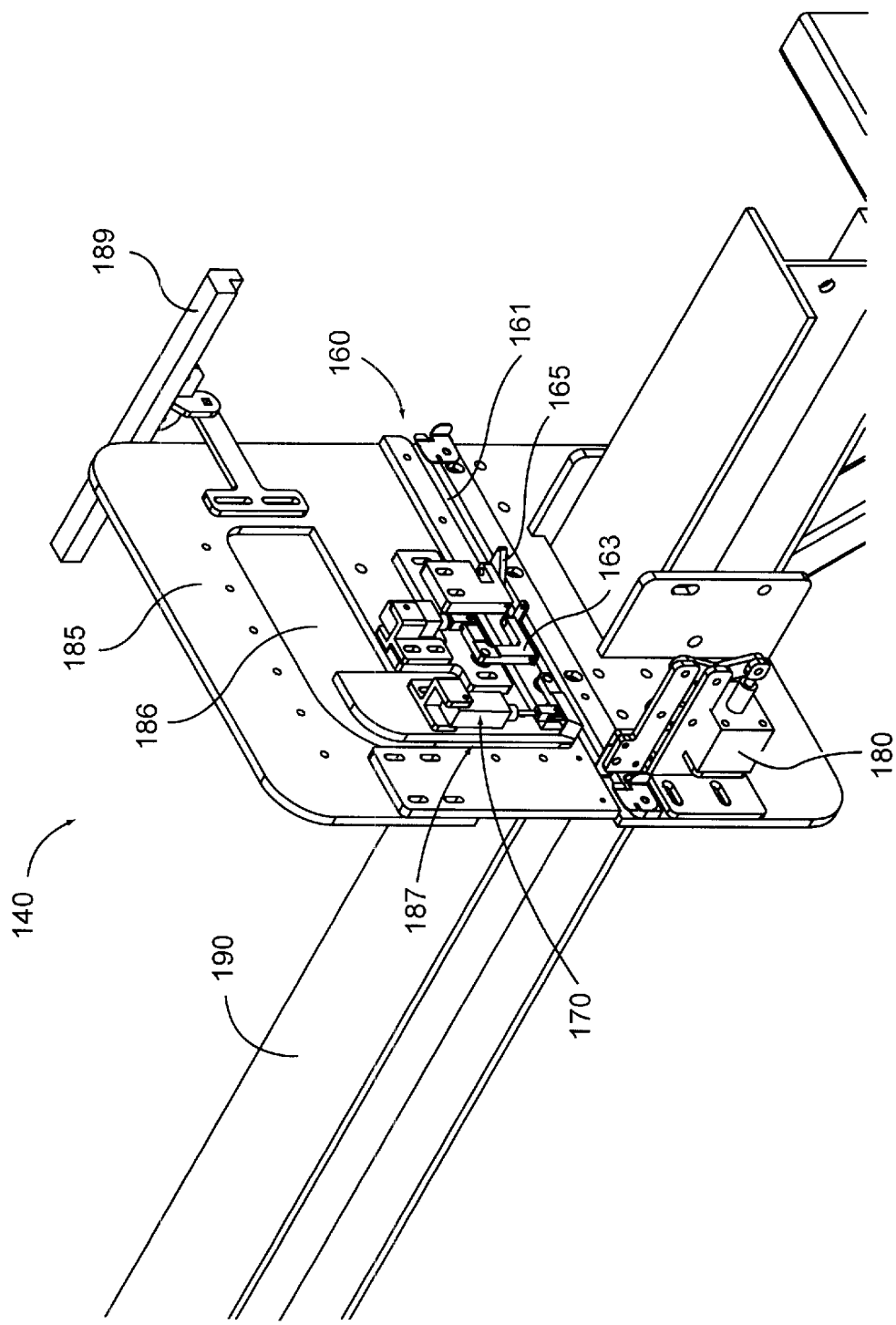
FIG. 3 is a diagrammatic perspective view of one embodiment of a tube inserter suitable for use in the production line of FIG. 2.

Referring next to FIG. 3, a tube inserter 140 in accordance with one embodiment of the invention will be described. It should be appreciated, however, that the actual construction of the tube inserters may be widely varied and the invention is not in any way to be limited to the described embodiment. In the illustrated embodiment, the tube inserter 140 has a frame 185 that is slideably mounted on a support beam 190. The frame 185 includes a conveyor slot 186 sized and shaped to receive the belt conveyor (not shown) that carries the tubing to be inserted. The frame 185 carries a strip feeder 160 for feeding the clip strip, an actuator assembly 170 for snapping tubes into the clip strip 200 and a cutter assembly 180 for cutting the clip strips as desired. The strip feeder 160 includes a feed slot 161 that receives a clip strip from an associated clip supply reel 142. An indexer 163 has teeth that are arranged to engage holes in the clip strip to move the strip along. A cleat arrangement 165 prevents the strip from slipping backwards in the feed slot 161.

A tube feed slot 187 extends from the conveyor slot 186 to a location along the strip feeder 160 adjacent the end of the actuator assembly 170 and serves as a guide for feeding tubes into position against the clip strip 200. An air knife 189 is used to pneumatically push the tube segment from the conveyor slot 186 into the feed slot 187. When a tube segment is positioned against the clip strip 200, the actuator 170 presses the tube into an associated tube clip 201 in the clip strip.

Typically, a plurality of aligned tube inserters 140 are mounted on the support beam 190. This permits a plurality of clip strips to be attached to the tube segments in parallel. Typically, the tubing would be snapped into the plurality of clip strips substantially simultaneously, however, this is not by any means a requirement. The tube inserters are preferably slidably mounted on the support beam 190 to permit the spacing between clip strips to be adjusted as desired.

The described production line can be used to produce a variety of different heat exchanger configurations with relatively minimal software adjustments and possibly repositioning of some of the tube inserters (if necessary). As should be apparent to those skilled in the art, the repositioning of the tube inserters may be done either manually or automatically. The software adjustments are quite simple and simply direct the control of the advancements of the tubing and clip strips between tube insertions and/or cuttings. It should be apparent that both the lengths of the tube segments being cut and the lengths of the clip strips being cut may be controlled (and controlled independently). Also, as will be described in more detail below, the length of the clip strips being cut as well as their relative advancements between tube insertions may differ between the various clip strips used in a particular heat exchanger panel. Additionally, different types of clip strips may be used at different positions along the tubes to help facilitate the construction of a desired panel. next to FIGS. 2 and 5(–b), the production of a heat exchanger panel 400 having a plurality of adjacent, evenly spaced tubes 410 and a pair of opposing header pipes 302 will be described. As discussed above, the extruder 110 produces continuous extruded plastic tubing which is passed through a cooling trough 122 on its way to cutter 126. The cutter 126 cuts the tubing into tube segments 410 having the length desired for the heat exchanger 400 to be built. The tube insertion station 130 is set up to feed a plurality of spaced apart clip strips (e.g., the single sided clips strips illustrated in FIG. 4(a)) to respective ones of the aligned tube inserters 140. To create the heat exchanger panel illustrated in FIG. 5(a), each clip strip is indexed a single tube clip 201 after each tube insertion. Thus, the tubes 410 occupy each adjacent tube clip 201 in each of the clip strips 200 to form a uniform sheet of tubing. The clip strips 200 are then cut at appropriate lengths (e.g., the desired panel width) by cutters 180 to form uniform tubing panels. The uniform tubing panels are then conveyed to the pipe attacher 153 which attaches header pipes 302 to the respective ends of the tubing panels, thereby substantially automatically forming flat heat exchange panels 400.

Figure 2:
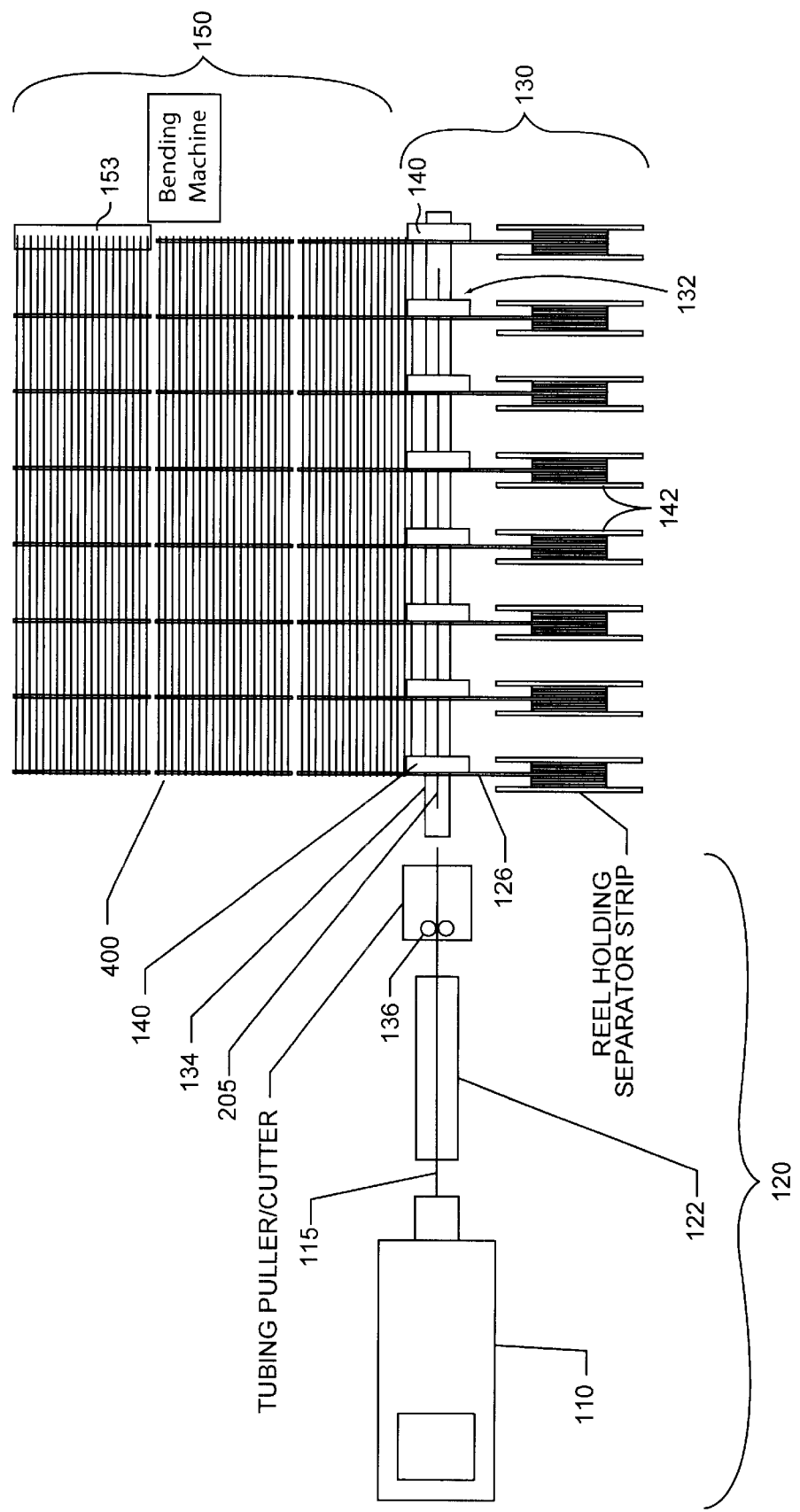
FIG. 2 is a top schematic plan view of a heat exchanger production line in accordance with one embodiment of the present invention.
Figure 4A:
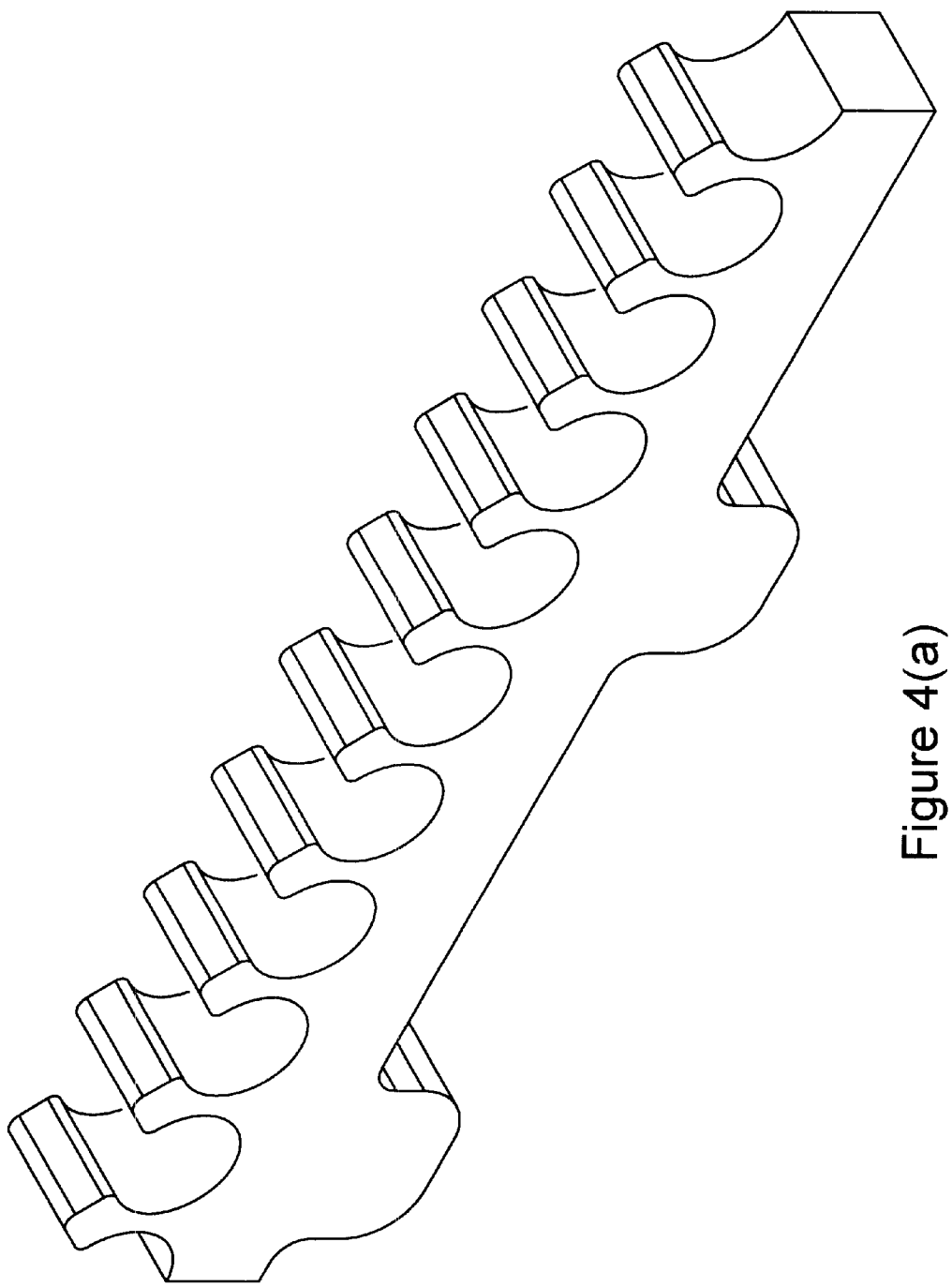
FIGS. 4(a) and 4(b) are diagrammatic perspective views of two different types of clip strips.
Figure 4B:
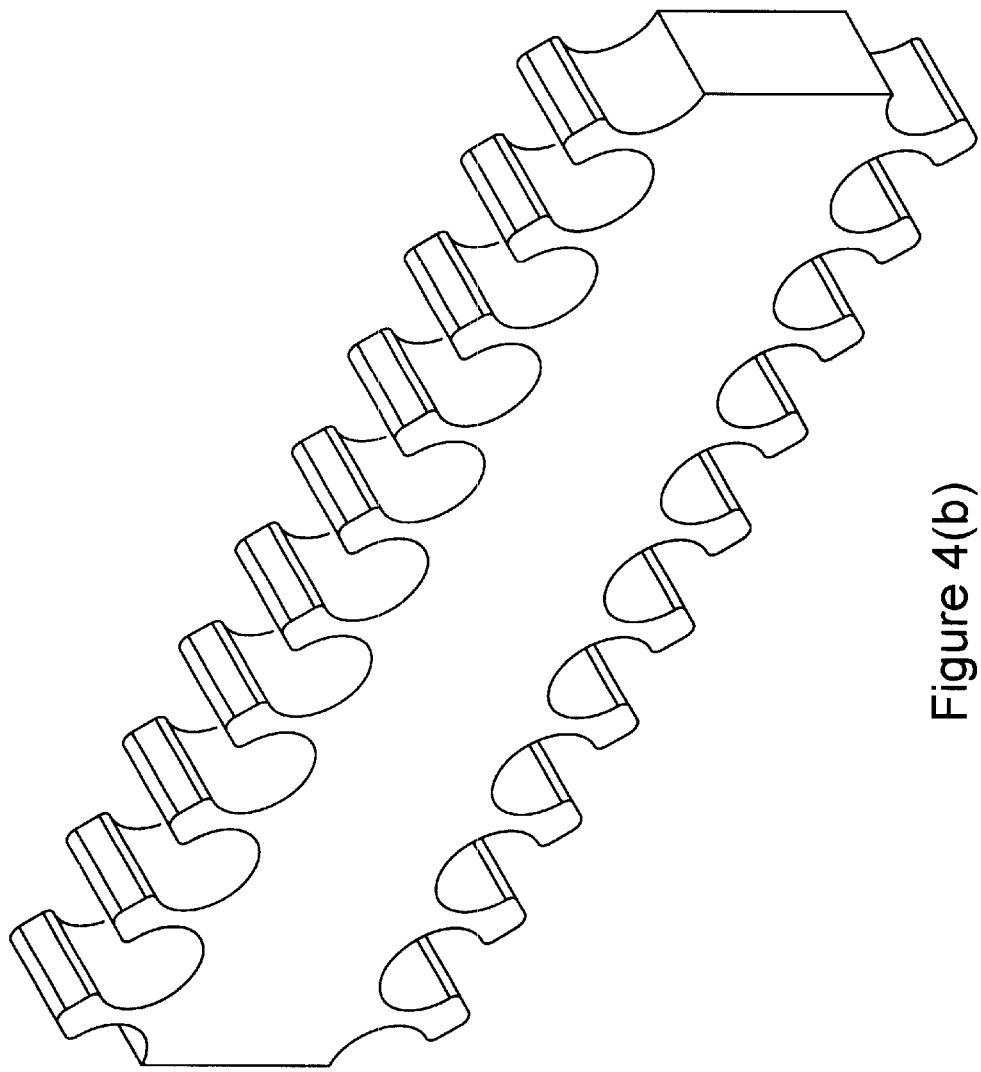
Figure 5A:
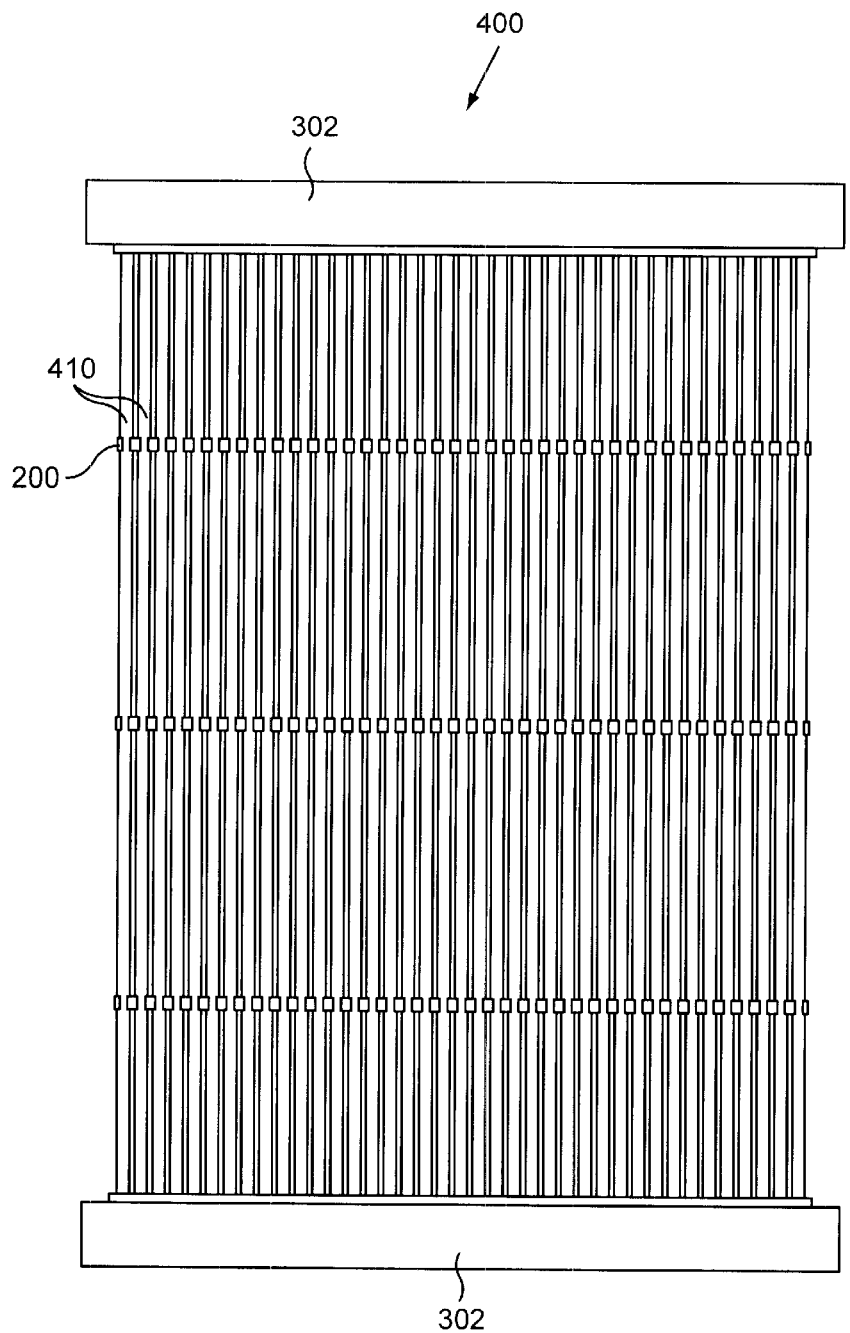
FIGS. 5(a) & 5(b) are diagrammatic front and side views respectively of a type of flat heat exchanger panel that may be fabricated using the production line illustrated in FIG. 2.

Referring next to FIGS. 2, 5(c–d) and 6(a–b), the production of an alternative heat exchanger panel 450 having laterally spaced tubes 410 will be described. In this embodiment, the extrusion and tube cutting are the same as described above with reference to the flat heat exchange panels. The tube insertion station 130 is arranged similarly as well. However, in this embodiment, the end clip strips 452 are single sided as illustrated in FIG. 4(a) while the middle clip strips 454 are duel sided as illustrated in FIG. 4(b). In the embodiment shown, the end clip strips are indexed a single tube clip 201 between each tube insertion, while the middle clip strips 454 are indexed a plurality of tube clips. As is best illustrated in FIG. 6(a), (and as may be better understood from the description below), the number of tube clips that are skipped between tube insertions in the middle clip strips 454 will control the lateral spacing of the heat exchanger tubes 410.

Figure 6A:
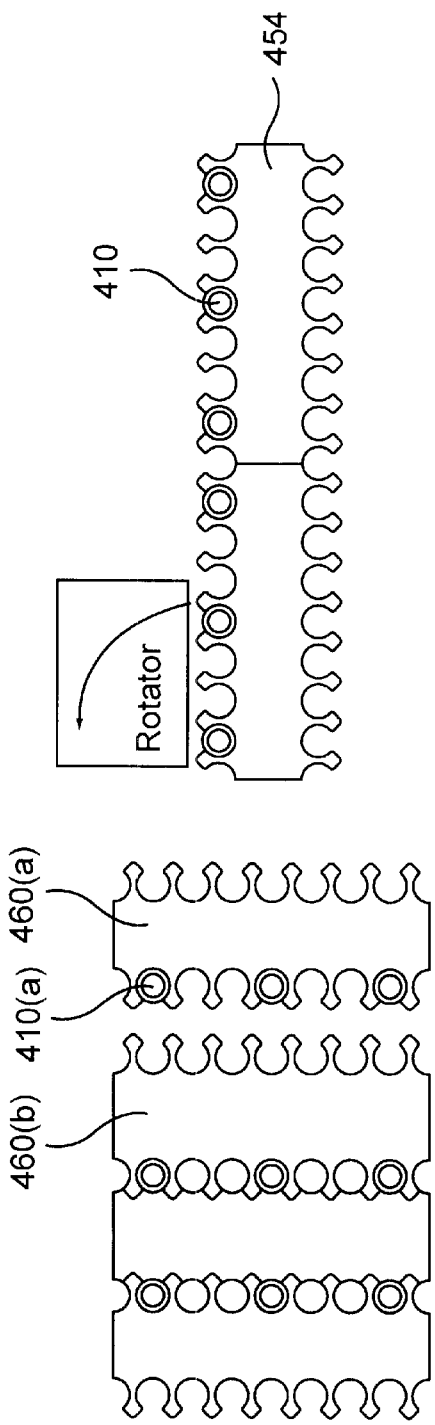
FIGS. 6(a) & 6(b) are schematic diagrams illustrating one mechanism for laterally spacing heat exchange tubes, with FIG. 6(a) illustrating a middle clip strip insertion pattern and FIG. 6(b) illustrating an end clip strip insertion pattern.
Figure 6B:
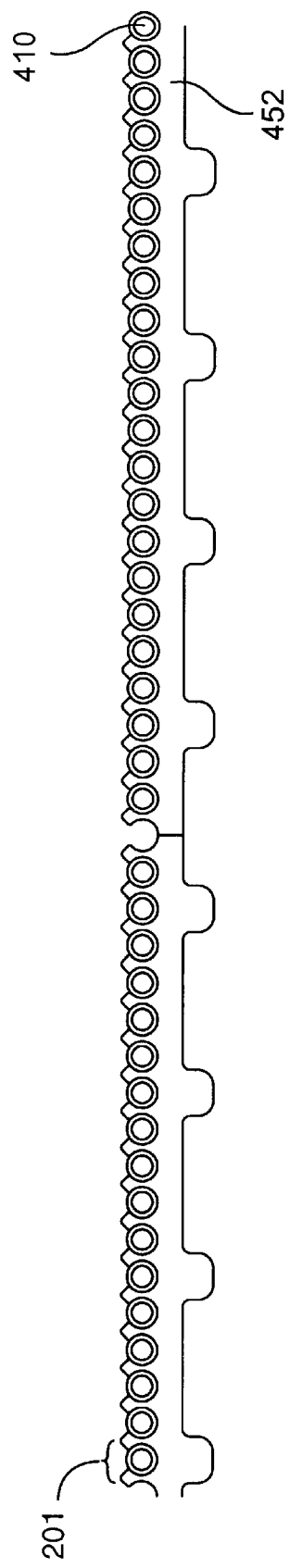

In the embodiment shown in FIG. 6, the middle clip strips 454 (FIG. 6(a)) are cut at significantly shorter lengths than the end clip strips 452 (FIG. 6(b)). These shortened clip strip segments form spacer segments 460 that are rotated to laterally space the middle sections of the heat exchanger tubes apart. In the embodiment shown, the spacer segments 460 are rotated substantially 90 degrees (although other rotation angles are possible). As best seen in FIG. 6(a), when a spacer segment 460(a) is rotated, the tubes 410(a) that it carries are pressed into the clips on the back side if the immediately preceding spacer segment 460(b). After pressing the tubes 410(a) into the preceding spacer 460(b), the spacer 460(a) may be offset slightly so it does not interfere with the spacers. With this arrangement the spacing between adjacent tubes in the spacer segments controls the lateral spacing of the tubes.

The number of tubes carried by each spacer segment may be widely varied, although it is expected that numbers in the range of two to ten rows of tubes, and more likely two to six tubes would be most commonly used in each spacer segment. In the embodiment shown, three tubes are carried by each spacer segment. The width of the middle clip strips 454 is selected so that when rotated, the spacing between rows of tubes lines up appropriately with the end clip strips 452. In the embodiment shown, this means that the width of the middle clip strip is equal to the width of three full clips 201. In the illustrated embodiment, each spacer segment has the same number of tubes and the rows of tubes are perfectly aligned. It should be apparent that other patterns can readily be imagined. For example, adjacent rows of tubes may be offset with respect to one another to form a staggered pattern. Alternatively (or additionally), the spacing between tubes in a particular row, or between tubes in different rows may readily be varied. This is easily accomplished since the spacer segments may be cut to any desired length and/or the spacing between adjacent tubes in the clip strip may be readily changed. For example, the tube spacing may be changed from tube by tube or from row to row, merely by changing the amount that the strips are indexed between insertions. Any of these adjustments may readily be accomplished using simple software control.

Figure 5B:
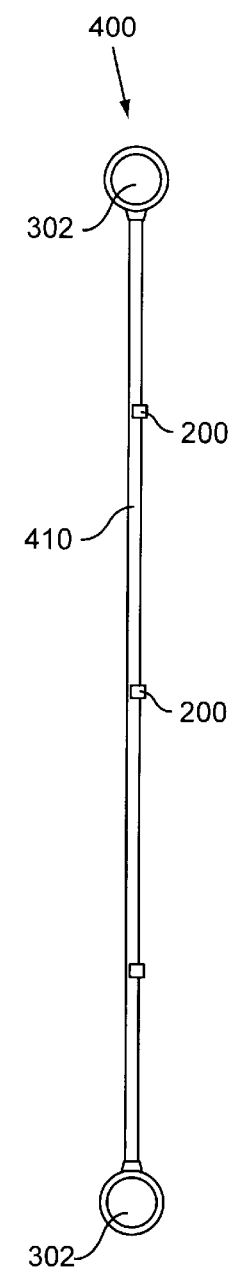

As in the previously described embodiment, when the desired panel width is attained, all of the clip strips (including the end clip strips 452) are cut and the panels are conveyed to the header pipe attacher 153. It should be appreciated that with the currently described arrangement, the end clip strips hold the ends of all of the tubes in the panel 450 in-line which means that the same pipe attacher 153 can be used for both flat panel heat exchangers and those having laterally spaced tubing. The resulting panels appear as illustrated in FIGS. 5(c) & 5(d). Thus, it should be apparent that the described production line is suitable for automatically producing both flat panels and panels having laterally spaced tubing as illustrated in FIGS. 5(b) and 5(d) respectively.

Figure 7A:
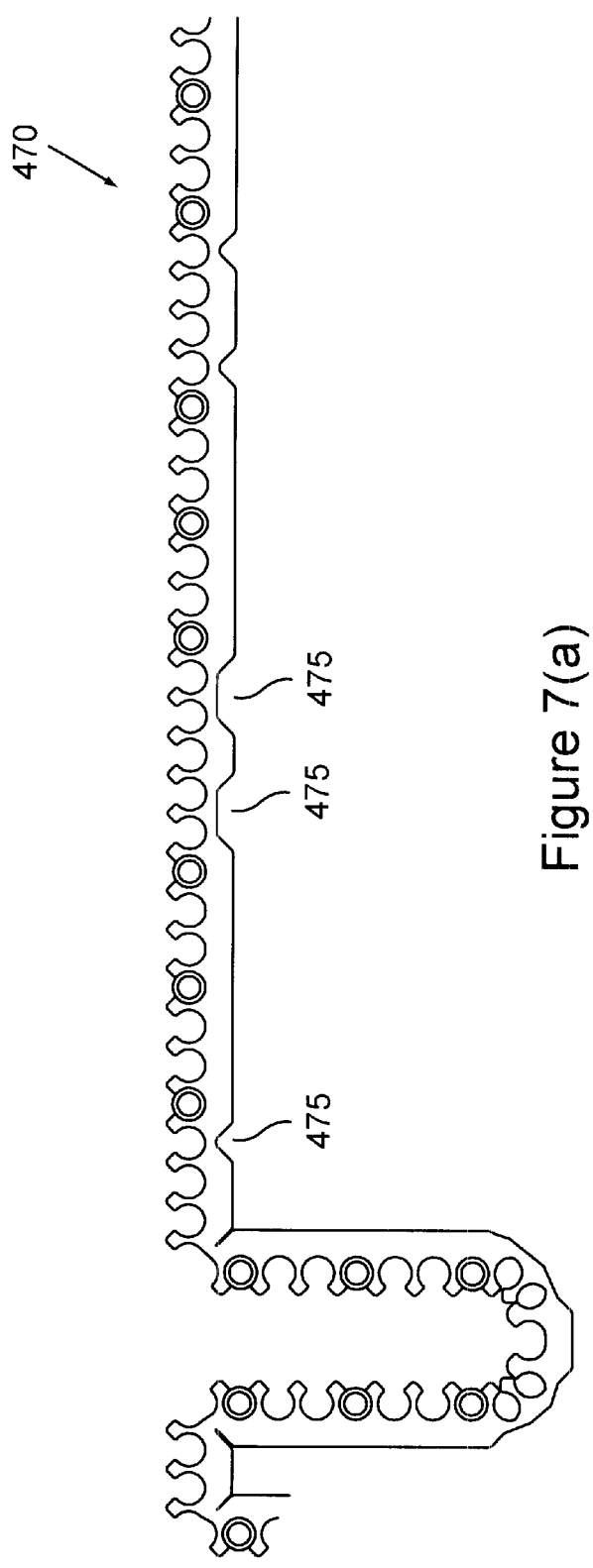
FIGS. 7(a)–7(b) are schematic diagrams illustrating a second mechanism for laterally spacing heat exchange tubes, with FIG. 7(a) illustrating a middle clip strip and FIG. 7(b) illustrating an end clip strip.
Figure 7B:
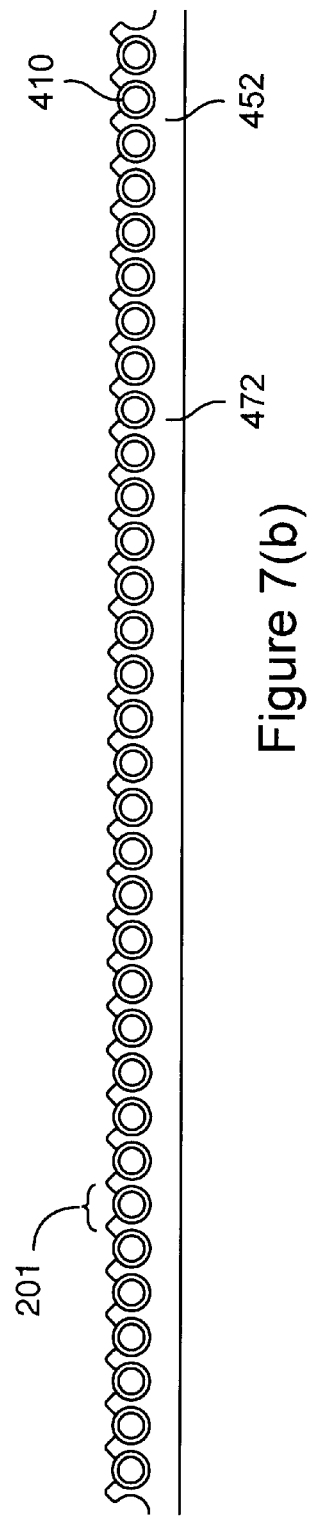

Referring next to FIGS. 7(a)–7(b), another laterally spaced tubing based heat exchanger production method will be described. The tube fabrication remains the same as the previously described embodiments. In this embodiment, all of the clip strips are single sided, although the middle clip strips 470 may have notches 475 premolded or cut therein to facilitate bending as best shown in FIG. 7(b). If cut, the cutting can be done in place or the strips can be precut before they are loaded on supply reels 142. Like the immediately previously described embodiment, the end clip strips are indexed a single tube clip 201 between each tube insertion, while the middle clip strips 470 are indexed a plurality of tube clips to control the lateral spacing of the heat exchanger tubes 410. However, rather than cutting spacer segments from the middle clip strips, the middle strips are folded back and forth as best seen in FIG. 7(a). The notches 475 (best seen in FIG. 7(a)) are cut into the middle clip strip 470 to define fold points that facilitate bending the strips back and forth in an alternating fold pattern.

As in the previously described embodiments, when the desired panel width is attained, all of the clip strips 472, 470 are cut and the panels are conveyed to the header pipe attacher 153. Again, the end clip strips 472 hold the ends of all the tubes in the panel 450 in-line for the pipe attacher 153. In some embodiments, it may be desirable to provide a bending machine to bend the heat exchanger tubing panels to permit the pipe attacher to attach header pipes to both ends of the heat exchanger tubing panels.

Although only a few embodiments of the present invention have been described, it should be understood that the present invention may be embodied in many other specific forms without departing from the spirit or scope of the invention. For example, although a particular tube inserter construction has been described, it should be apparent that a wide variety of tube inserter configurations may be used within the described production line. Similarly, the actual construction of any of the other described components may be widely varied. The geometries of the clip strips used may also be widely varied to meet the needs of a particular heat exchanger with the only real requirement being that the tube inserters must be capable (or made capable) of handling the new and/or alternative clip strip geometries.

It should also be appreciated that additional stations may readily be added to the production line to handle other tasks. By way of example, in some heat exchangers (as for example those used in thermal storage systems) it is desirable to fold the heat exchangers so that both the supply and return headers are located on the same side. A folding station can readily be added to accomplish this. In other heat exchanger designs it may be desirable to use a single header pipe to function as both the supply and return pipes. A suitable folding and aligning station can readily be added to facilitate this as well. Therefore, it should be apparent that the present examples are to be considered as illustrative and not restrictive, and the invention is not to be limited to the details given herein, but may be modified within the scope of the appended claims.

What is claimed is:

1. A heat exchanger production line comprising:
    a tubing cutter for cutting plastic tubing into tube segments;
    a plurality of aligned tube inserters, each tube inserter being arranged to receive an associated clip strip having a plurality of tube snaps thereon, each tube inserter being arranged for receiving plastic tubing and for automatically inserting the tubing into the tube snaps of the tube inserter's associated clip strip; and
    at least one clip strip cutter for cutting the clip strips at desired locations to provide heat exchanger tubing panels.

2. A heat exchanger production line as recited in claim 1 further comprising a pipe attacher for attaching header pipes to first ends of the heat exchanger tubing panels.

3. A heat exchanger production line as recited in claim 2 further comprising a bending machine for bending the heat exchanger tubing panels to permit the pipe attacher to attach header pipes to both ends of the heat exchanger tubing panels.

4. A heat exchanger production line as recited in claim 1 further comprising a rotator arranged to rotate spacer segments cut from an associated clip strip after the tubing has been inserted into a spacer segment portion of the associated clip strip to laterally offset at least some of the tubing from a plane including ends of others of the tubing of an associated tubing panel.

5. A heat exchanger production line as recited in claim 1 further comprising a plurality of clip strip feeder reels, each feeder reel being arranged to feed an associated clip strip to an associated tube inserter.

6. A heat exchanger production line as recited in claim 1 further comprising a support beam, the tube inserters being slidably mounted on the support beam to facilitate adjusting the spacing of the clip strips in the heat exchanger tubing panels.

7. A heat exchanger production line as recited in claim 1 wherein the tube inserters each include:
    a clip strip advancer arranged to advance the tube inserter's associated clip strip; and
    an actuator for pressing the tubing into the clip strip.

8. A heat exchanger production line as recited in claim 7 further comprising:
    a conveyor for transporting the plastic tube segments to the tube inserters; and
    wherein each tube inserter further comprises an air knife for blowing a received tube segment from the conveyor into a position where the actuator can press the received tube segment into the associated clip strip.

9. A heat exchanger production line as recited in claim 1 further comprising:
    an extruder for extruding plastic tubing; and
    a cooling trough positioned between the extruder and tubing cutter.

10. A heat exchanger production line comprising:
    an extruder for extruding plastic tubing;
    a cooling trough positioned adjacent the extruder for cooling extruded plastic tubing;
    a tubing cutter for cutting extruded plastic tubing into tube segments;
    a plurality of clip strip feeder reels;
    a plurality of aligned tube inserters each positioned to receive a clip strip from an associated feeder reel, the tube inserters being arranged to automatically insert the plastic tubing into their associated clip strips;
    clip strip cutters for cutting the clip strips at desired locations to provide heat exchanger tubing panels; and
    a pipe attacher for attaching header pipes to first ends of the heat exchanger tubing panels.

11. A heat exchanger production line as recited in claim 10 wherein the tube inserters include distal and proximal tube inserters and at least one middle tube inserter, the production line further comprising a rotator for rotating spacer segments cut from a clip strip associated with the middle tube inserter relative to the clip strips outputted from the proximal and distal tube inserters to provide lateral spacing of at least some of the tubing in an associated heat exchanger tubing panel from a plane including proximal and distal ends of others of the tubing of the respective panel.

12. A heat exchanger production line as recited in claim 11 further comprising a bending machine for bending the heat exchanger tubing panels to permit the pipe attacher to attach header pipes to both ends of the heat exchanger tubing panels.

13. A heat exchanger production line as recited in claim 10 herein the extruder, the cooling trough, the tubing cutter and the tube inserters are arranged along one line and the clip strip feed reels, the clip strip cutters and the pipe attacher are aligned along a second line that transversely intersects the first line at the tube inserters.

14. A tube inserter suitable for inserting plastic tubing into a plastic clip strip, the tube inserter comprising:
    a clip strip feed channel for receiving a clip strip;
    a clip strip advancer arranged to advance the received clip strip through the clip strip feed channel;
    a tubing feed channel for receiving tubing;
    an actuator for pressing tubing received through the tubing feed channel into the clip strip received through the clip strip feed channel; and
    a clip strip cutter.

15. A tube inserter as recited in claim 14 further comprising:
    an air knife for blowing a tubing received through the tubing feed channel into a position where the actuator can press the tubing into the received clip strip.

16. A heat exchanger production line comprising:
    a support beam; and
    a plurality of tube inserters as recited in claim 14 the tube inserters being slidably mounted on the support beam and arranged to insert a tube segment of the tubing into a plurality of the clip strips to facilitate the production of heat exchanger tubing panels.

* * * * *